United States Patent
Mayo et al.

(10) Patent No.: US 11,748,408 B2
(45) Date of Patent: Sep. 5, 2023

(54) ANALYZING USER SEARCHES OF VERBAL MEDIA CONTENT

(71) Applicant: Amazon Technologies, Inc., Seattle, WA (US)

(72) Inventors: Michael S. Mayo, Seattle, WA (US); Brent M. Barkman, Seattle, WA (US); Abhishek Dubey, Seattle, WA (US); Neeti Gupta, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1003 days.

(21) Appl. No.: 15/992,698

(22) Filed: May 30, 2018

(65) Prior Publication Data

US 2018/0276298 A1 Sep. 27, 2018

Related U.S. Application Data

(63) Continuation of application No. 14/885,400, filed on Oct. 16, 2015, now Pat. No. 10,007,725, which is a continuation of application No. 13/647,931, filed on Oct. 9, 2012, now Pat. No. 9,165,072.

(51) Int. Cl.
| | | |
|---|---|---|
| *G06F 16/783* | (2019.01) | |
| *G06F 16/738* | (2019.01) | |
| *G06F 16/9535* | (2019.01) | |
| *G06F 16/2457* | (2019.01) | |
| *G06Q 30/0241* | (2023.01) | |

(52) U.S. Cl.
CPC .... *G06F 16/7844* (2019.01); *G06F 16/24575* (2019.01); *G06F 16/738* (2019.01); *G06F 16/9535* (2019.01); *G06Q 30/0276* (2013.01)

(58) Field of Classification Search
CPC ............... G06F 16/7844; G06F 16/738; G06F 16/24575; G06F 16/9535; G06Q 30/0276
See application file for complete search history.

(56) References Cited

U.S. PATENT DOCUMENTS

| | | |
|---|---|---|
| 6,370,543 B2 | 4/2002 | Hoffert et al. |
| 6,785,671 B1 * | 8/2004 | Bailey .................... G06Q 10/02 705/5 |
| 7,111,315 B1 | 9/2006 | Tsurumoto |

(Continued)

OTHER PUBLICATIONS

"Record and Search TV Coverage in a Snap!—SnapStream Enterprise" (http://www.snapstream.com/enterprise/default.asp) on Sep. 21, 2011 as retrieved by Internet Archive (https://archive.org/index.php).

(Continued)

*Primary Examiner* — Kris E Mackes
(74) *Attorney, Agent, or Firm* — Thomas Horstemeyer, LLP

(57) ABSTRACT

Disclosed are various embodiments for analyzing searches of verbal media content associated with media content features. A relatively popular portion of a media content item is determined based at least in part on a dialogue of the relatively popular portion of the media content item being included in a plurality of dialogue search queries received from a plurality of client devices. The media content item is rendered via a client device, and a recommendation for an item is via the client device in response to the relatively popular portion of the media content item being rendered.

20 Claims, 4 Drawing Sheets

(56) References Cited

U.S. PATENT DOCUMENTS

| | | | |
|---|---|---|---|
| 7,680,853 | B2 | 3/2010 | Yu et al. |
| 8,214,374 | B1 | 7/2012 | Acharya |
| 2003/0229813 | A1 | 12/2003 | Shiiyama |
| 2006/0271594 | A1* | 11/2006 | Haberman ......... H04N 5/44543 |
| 2007/0124777 | A1 | 5/2007 | Bennett et al. |
| 2007/0174774 | A1 | 7/2007 | Lerman et al. |
| 2007/0253678 | A1* | 11/2007 | Sarukkai ................ G11B 27/28 |
| | | | 386/241 |
| 2007/0266002 | A1 | 11/2007 | Chowdhury et al. |
| 2009/0022473 | A1 | 1/2009 | Cope et al. |
| 2009/0112714 | A1 | 4/2009 | Steelberg et al. |
| 2009/0234735 | A1 | 9/2009 | Maurer |
| 2011/0035219 | A1 | 2/2011 | Kadirkamanathan et al. |
| 2011/0078724 | A1 | 3/2011 | Mehta et al. |
| 2012/0066243 | A1 | 3/2012 | Jammalamadaka |
| 2012/0095958 | A1 | 4/2012 | Pereira et al. |
| 2012/0123674 | A1* | 5/2012 | Perks ................ G06Q 30/0631 |
| | | | 701/426 |
| 2012/0148215 | A1 | 6/2012 | Kennedy |
| 2012/0219265 | A1 | 8/2012 | Sriganesh et al. |
| 2012/0284094 | A1 | 11/2012 | De León et al. |
| 2013/0227401 | A1 | 8/2013 | Kandekar et al. |
| 2014/0157306 | A1 | 6/2014 | Deo et al. |
| 2014/0351836 | A1 | 11/2014 | Hayashida |
| 2015/0334472 | A1 | 11/2015 | Kishore |
| 2017/0213243 | A1* | 7/2017 | Dollard .............. G06Q 30/0249 |

OTHER PUBLICATIONS

Wei, Eugene. "Search Captions on Hulu" (http://blog.hulu.com/2009/12/21 /search-captions-on-hulu/) published on Dec. 21, 2009 and retrieved by Internet Archive on Jul. 4, 2011 (https://archive.org/index.php).

Hulu—Support, http://web.archive.org/web/20101108081607/http://www.hulu.com/support/article/166529, dated Jun. 29, 2010.

Movie Quotes—Subzin.com, http://web.archive.org/web/20110716162224/http://www.subzin.com/, archived Jul. 22, 2011.

U.S. Appl. No. 13/647,931, filed Oct. 9, 2012, Non-Final Office Action dated Dec. 5, 2014.

U.S. Appl. No. 13/647,931, filed Oct. 9, 2012, Notice of Allowance dated Jun. 19, 2015.

U.S. Appl. No. 13/647,931, filed Oct. 9, 2012, Response to Non-Final Office Action dated Dec. 5, 2014.

U.S. Appl. No. 14/885,400, filed Oct. 16, 2015, Non-Final Office Action dated Oct. 19, 2017.

U.S. Appl. No. 14/885,400, filed Oct. 16, 2015, Notice of Allowance dated Oct. 19, 2017.

U.S. Appl. No. 14/885,400, filed Oct. 16, 2015, Response to Non-Final Office Action dated Oct. 19, 2017.

U.S. Appl. No. 15/079,801, filed Mar. 24, 2016, Non-Final Office Action dated Dec. 2, 2016.

U.S. Appl. No. 15/079,801, filed Mar. 24, 2016, Notice of Allowance dated Mar. 20, 2017.

U.S. Appl. No. 15/079,801, filed Mar. 24, 2016, Response to Non-Final Office Action dated Dec. 2, 2016.

U.S. Appl. No. 15/618,447, filed Jun. 9, 2017, Non-Final Office Action dated Feb. 26, 2018.

U.S. Appl. No. 15/618,447, filed Jun. 9, 2017, Non-Final Office Action dated Aug. 25, 2017.

U.S. Appl. No. 15/618,447, filed Jun. 9, 2017, Notice of Allowance dated Jul. 5, 2018.

U.S. Appl. No. 15/618,447, filed Jun. 9, 2017, Response to Non-Final Office Action dated Feb. 26, 2018.

U.S. Appl. No. 15/618,447, filed Jun. 9, 2017, Response to Non-Final Office Action dated Aug. 25, 2017.

* cited by examiner

ANALYZING USER SEARCHES OF VERBAL MEDIA CONTENT

CROSS-REFERENCE TO RELATED APPLICATIONS

This application is a continuation of, and claims priority to, co-pending U.S. Patent Application entitled "ANALYZING USER SEARCHES OF VERBAL MEDIA CONTENT," filed on Oct. 16, 2015, and assigned application Ser. No. 14/885,400, which is a continuation of, and claims priority to, U.S. Patent Application entitled "ANALYZING USER SEARCHES OF VERBAL MEDIA CONTENT," filed on Oct. 9, 2012, assigned application Ser. No. 13/647,931, issued on Oct. 20, 2015, and assigned U.S. Pat. No. 9,165,072, which is incorporated herein by reference in its entirety.

BACKGROUND

Certain portions of a movie or other media content may be more interesting to users than other portions. For example, a movie may have a particularly memorable scene with sophisticated visual effects. Movie producers may select such a scene for inclusion in a trailer. Likewise, an episode of a television series may have a particular scene with powerful dialogue. The series producer may choose to highlight a portion of the scene within advertising promoting the airing of the episode.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to determining user interest in media content expressed through searches of verbal media content. Media content, such as video content and/or audio content, may include verbal media content. Non-limiting examples of such media content may include movies, television shows, audio books, songs, and so on. Non-limiting examples of such verbal media content may include movie dialogue, television dialogue, audio book clips, song lyrics, and others.

Search functionality may be provided to search within verbal media content. Corresponding portions of the media content may be surfaced to users as search results in response to verbal media content searches. To illustrate, a user may search for a particular quote within a movie dialogue database. Various matches may be found and ranked according to relevancy and/or other factors. Along with each match, a clip of a movie may be surfaced to the user, where the clip features dialogue that matches the search query. The clip may be the particular scene featuring the dialogue. If the user is interested in the clip, the user may select the clip for viewing, download, purchase, adding to a watch list, etc.

Various embodiments of the present disclosure gather user interest data pertaining to verbal media content searches and selections of search results. The user interest data may be analyzed to drive recommendations of media content and/or portions of media content. Customized compilations of media content may be generated based at least in part on portions of media content selected by users as part of a verbal media content search. Similarities and relationships among different users may be determined from the user interest data. In the following discussion, a general description of the system and its components is provided, followed by a discussion of the operation of the same.

Figure 1:
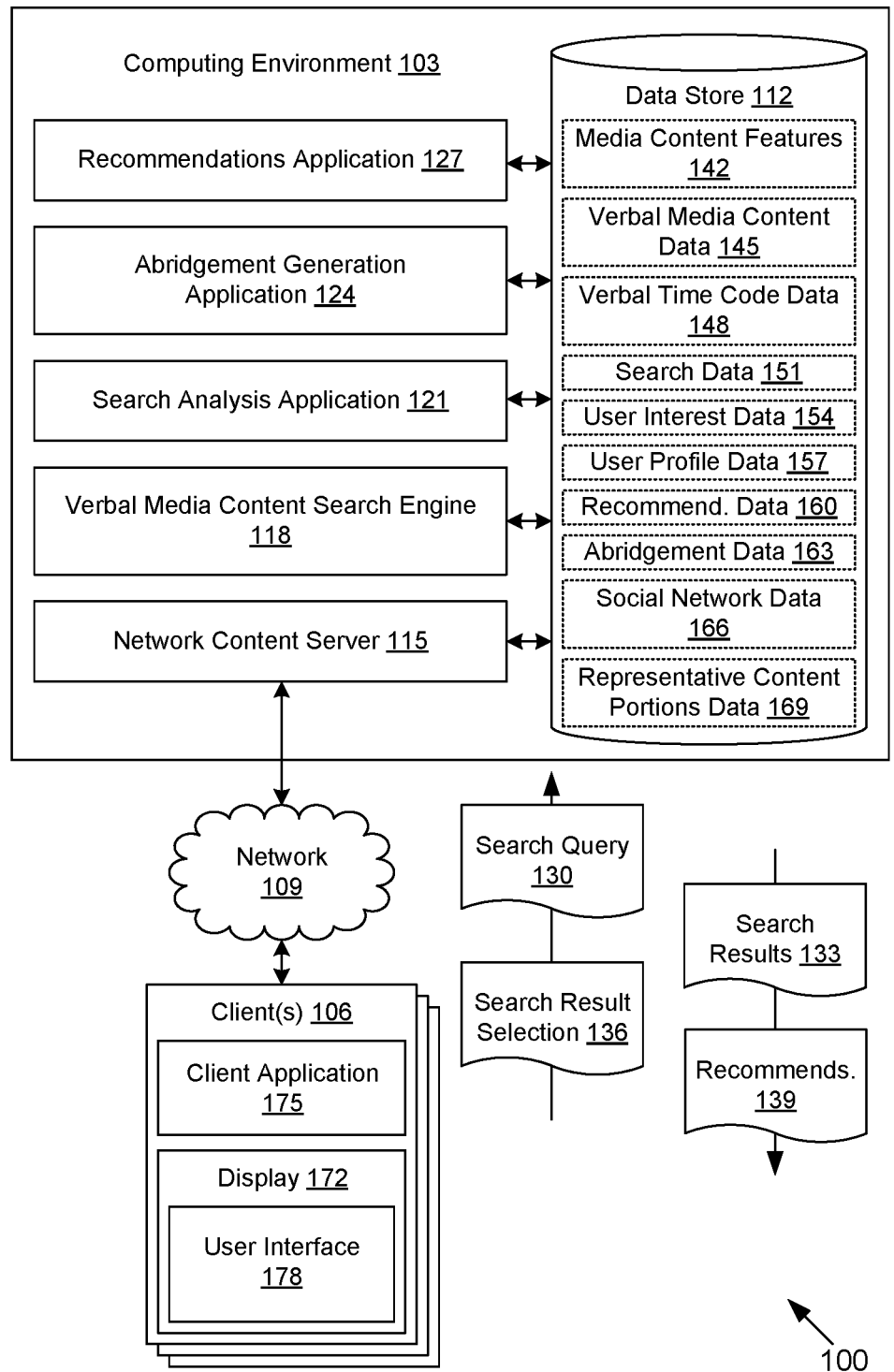
FIG. 1 is a drawing of a networked environment according to various embodiments of the present disclosure.

With reference to FIG. 1, shown is a networked environment 100 according to various embodiments. The networked environment 100 includes a computing environment 103 and one or more clients 106 in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, a content delivery network, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a network content server 115, a verbal media content search engine 118, a search analysis application 121, an abridgement generation application 124, a recommendations application 127, and other applications, services, processes, systems, engines, or functionality not discussed in detail herein. The network content server 115 is executed to serve up network content such as, for example, web pages, mobile application data, and/or other forms of network content. The network content server 115 may comprise a commercially available hypertext transfer protocol (HTTP) server such as, for example, Apache® HTTP Server, Apache® Tomcat®, Microsoft® Internet Information Services (IIS), and others. It is noted that multiple different network content servers 115 may be employed in the computing environment 103 in various embodiments. For purposes of discussion, the network content server 115 is referred to herein in the singular.

The verbal media content search engine 118 is executed to perform searches of verbal media content corresponding to media content. To this end, the verbal media content search engine 118 obtains a search query 130 from a user at the client 106 and then generates search results 133 based at least in part on the search query 130. The verbal media content search engine 118 may be configured to record data relating to such searches, such as the search queries 130, the search results 133, search result selections 136, and/or other data.

The search analysis application 121 is executed to analyze this data relating to the verbal media content searches for various purposes. For example, in one embodiment, the analysis performed by the search analysis application 121 may be used by the abridgement generation application 124 to generate a customized abridgement of a media content feature for a user or group of users. In another embodiment, the analysis performed by the search analysis application 121 may be used by the recommendations application 127 to generate recommendations 139 of additional media content to a user or to generate recommendations 139 of user-selected portions of media content to other users. In another embodiment, the analysis performed by the search analysis application 121 may be used to select a portion of a media content feature as a representative portion for previewing. In yet another embodiment, the analysis performed by the search analysis application 121 may be used to market products to a user.

The data stored in the data store 112 includes, for example, media content features 142, verbal media content data 145, verbal time code data 148, search data 151, user interest data 154, user profile data 157, recommendations data 160, abridgement data 163, social network data 166, representative content portions data 169, and potentially other data. The media content features 142 correspond to features of media content in various forms that may be made available to clients 106. For example, the media content features 142 may correspond to video content features such as movies, television shows, video clips, and so on. The media content features 142 may also correspond to audio content features such as songs, audio books, and others. It is noted that video content features may include corresponding audio content. The media content features 142 may be divided into scenes, segments, chapters, pages, and/or other parts or portions.

The verbal media content data 145 includes data relating to the verbal media content of the media content features 142. Such verbal media content may include, for example, movie and television show dialogue, audio book text, song lyrics, and so on. The verbal media content may be obtained from closed captioning data, subtitle data, lyric data, screenplay data, audio book transcript data, and/or other data. The verbal media content may track the audio content of the media content feature 142. In some cases, the verbal media content may track alternate audio and/or verbal content of a media content feature 142 such as, for example, an alternative language, an alternative dialogue, commentaries, etc.

The verbal time code data 148 correlates the verbal media content data 145 with the media content features 142. Specifically, the verbal time code data 148 corresponds to an index that associates words, phrases, sentences, and/or other divisions of language in the verbal media content data 145 with times, frames, scenes, etc. in the corresponding media content feature 142. The verbal time code data 148 may include multiple indexes for multiple languages or alternative verbal media content for a media content feature 142. The search data 151 records data relating to verbal media content searches performed by users. To this end, the search data 151 may include search queries 130, search results 133, search result selections 136, and/or other data. The search data 151 may also record the absence of search result selections 136 of users.

The user interest data 154 associates an expressed interest in media content with users, where the expressed interest is determined relative to search results 133 that result from verbal media content searches. The user interest data 154 is generated by the search analysis application 121 through analysis of the search data 151. In various embodiments, a user may express an interest in a media content feature 142 by first executing a search query 130 that produces a search result 133 corresponding to the media content feature 142, and then selecting the search result 133 to obtain further information, to view at least a portion of the media content feature 142, to add the media content feature 142 to a watch list, to purchase or rent the media content feature 142, and/or to perform other selection actions relative to the search result 133. The expressed user interests may be grouped by or otherwise associated with a particular language or locale, as users from different locales or using different languages may have different reactions to verbal content.

The user profile data 157 includes various information collected from or generated regarding users. Such information may include purchase history, download history, browse history, media content viewing history, favorite media content, favorite categories of media content, preferences, and/or other data. The recommendations data 160 may correspond to recommendations 139 generated by the recommendations application 127 for a user or group of users. Such recommendations 139 may recommend a media content feature 142 or one or more portions of a media content feature 142 based at least in part on user interest data 154, user profile data 157, and/or other data.

The abridgement data 163 includes data describing one or more abridgements of media content features 142 generated by the abridgement generation application 124. Each abridgement of a media content feature 142 includes one or more portions, clips, or scenes taken from the media content feature 142 based at least in part on relative popularity as determined through the user interest data 154. The abridgements may be customized for a particular user or group of users, or the abridgements may be produced for a general audience. An abridgement, for example, may correspond to a customized trailer, summary, or preview for a video content feature.

The social network data 166 may be employed to identify relationships between users for purposes of making recommendations 139. For example, users who are related in a social network may have similar interests and may be interested in similar media content. In some cases, notifications may be provided to a social network in response to a customized abridgement, a recommendation 139, etc. being generated for a user on the social network. The representative content portions data 169 corresponds to representative portions of media content features 142 that have been identified as particularly representative of the respective media content features 142 through the user interest data 154. Such representative content portions may, for example, be employed for preview or promotional purposes in a network page or other user interface that describes the corresponding media content feature 142.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 172. The display 172 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a client application 175 and/or other applications. The client application 175 may be executed in a client 106, for example, to access network content served up by the computing environment 103 and/or other servers, thereby rendering a user interface 178 on the display 172. The client application 175 may, for example, correspond to a browser, a mobile application, a media player, etc., and the user interface 178 may correspond to a network page, a mobile application screen, a rendered media content feature 142, etc. The client 106 may be configured to execute applications beyond the client application 175 such as, for example, browsers, mobile applications, email applications, social networking applications, and/or other applications.

Next, a general description of the operation of the various components of the networked environment 100 is provided. To begin, users at clients 106 request resources from the network content server 115. The users may be unrecognized, recognized, or authenticated users. A form in a user interface 178 may be rendered by the client application 175 that facilitates user entry of a search query 130. The search query 130 may correspond, for example, to a string of one or more words or partial words. As previously discussed, the search query 130 pertains to verbal media content associated with media content features 142. The user may be able to select a particular search data set according to criteria, e.g., movies, television shows, movies before 1980, a particular television series, audio books by a particular author, popular movies currently showing in theatres, songs by a particular artist, and so on.

Upon user entry of the search query 130, the client application 175 sends the search query 130 over the network 109 to the computing environment 103. The verbal media content search engine 118 obtains the search query 130 and proceeds to execute a search within the verbal media content data 145 based at least in part on the search query 130. The scope of the search may be limited by various criteria specified by the user. Various search results 133 that are relevant to the search query 130 may be generated.

Figure 2:
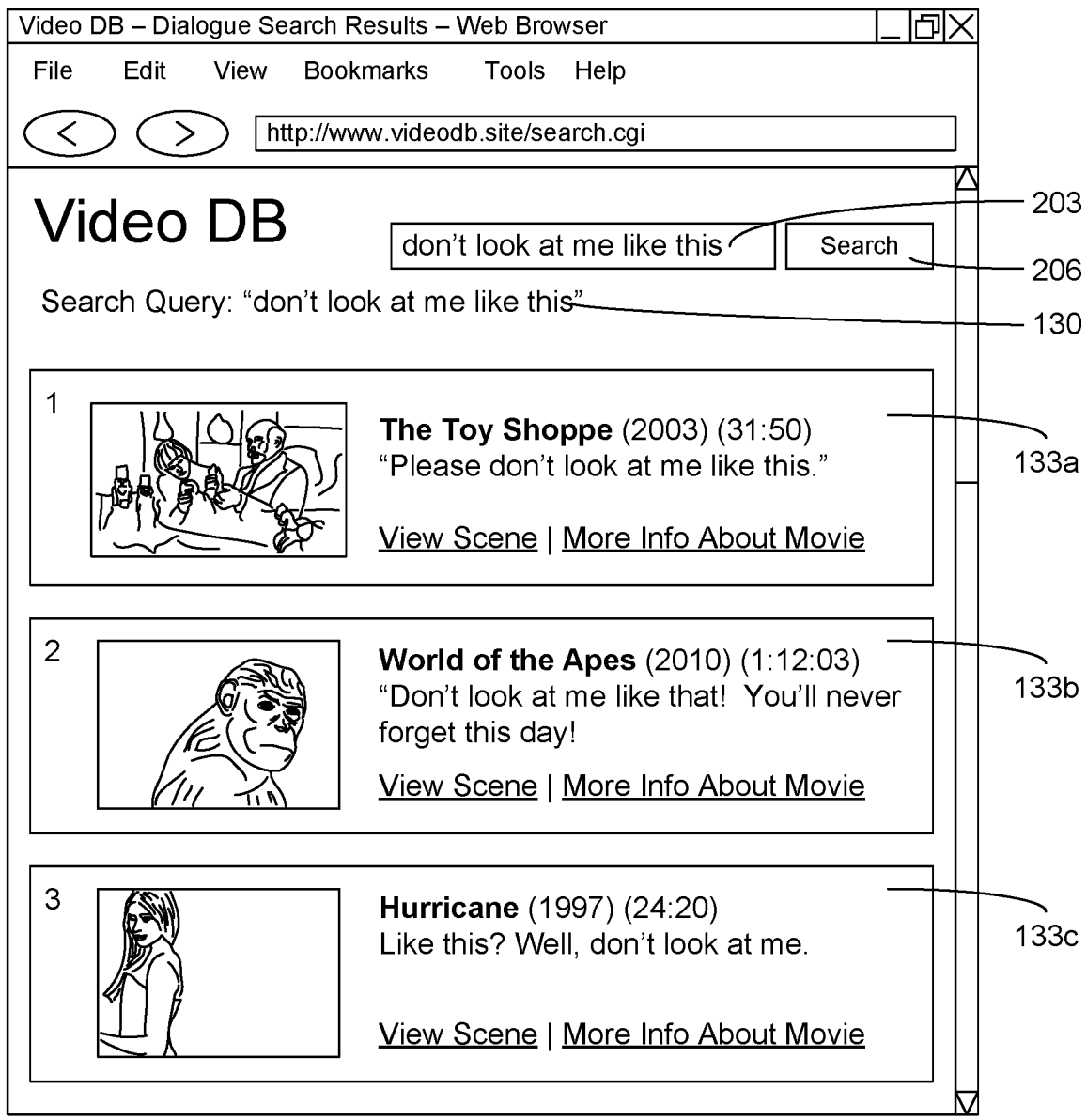
FIG. 2 is a drawing of an example of a user interface rendered by a client in the networked environment of FIG. 1 according to various embodiments of the present disclosure.

Turning now to FIG. 2, shown is one example of a user interface 178 rendered by a client application 175 (FIG. 1) executed in a client 106 (FIG. 1) in the networked environment 100 (FIG. 1). The user interface 178 provides a non-limiting example of a listing of three search results 133*a*, 133*b*, and 133*c*. The user interface 178 provides results from a search executed for the search query 130 of "don't look at me like this." A search query entry box 203 and a search execution component 206 may be provided to execute additional searches.

Each of the search results 133 may provide a title, a year, and/or other information about a corresponding media content feature 142 (FIG. 1). The search result 133 may identify a particular time in the media content feature 142 at which the search query 130 is used, or otherwise matches verbiage that is used. A portion of the verbal media content (e.g., a quotation from the verbal media content) may be rendered in connection with the search result 133. For video content, a representative image may be extracted from the video content at approximately the time at which the matched verbiage is used.

Various user interface components may be provided in the user interface 178 for the user to obtain more information about or indicate a further interest in a search result 133. As non-limiting examples, the user may click on the representative image or another link in order to view the scene, add the scene to a watch list, add the media content feature 142 to a watch list, purchase or rent the media content feature 142, view the media content feature 142, obtain additional information regarding the context of the quotation, obtain additional information regarding the media content feature 142, and/or perform other actions. The particular portion of the media content feature 142 that may be linked to the search result 133 may be determined from the verbal time code data 148 (FIG. 1). The portion may be a predefined portion (e.g., a scene, chapter, etc.) or may be dynamically determined with reference to the matched verbal media content (e.g., beginning 10 seconds before and continuing 30 seconds after the matched verbal media content, coextensive with the matched verbal media content, etc.).

When the user performs any of these actions to obtain more information about or indicate a further interest in a search result 133, a search result selection 136 (FIG. 1) may be sent by the client application 175 to the computing environment 103 by way of the network 109. The search result selection 136 may be stored and/or indexed by the verbal media content search engine 118 (FIG. 1) in the search data 151 (FIG. 1) for further processing. It is noted that a user may perform selection actions regarding multiple search results 133 in a listing of search results 133. Although the example of FIG. 2 pertains to a video content feature, it is understood that the example of FIG. 2 may be extended to audio books, songs, and/or other media content that does not include video content.

Referring back to FIG. 1, as users execute searches and perform selection actions relative to user interfaces 178 pertaining to search results 133, the search data 151 is populated. The search data 151 may also include the corresponding search queries 130. The search analysis application 121 performs an analysis on the search data 151 to determine user interest in particular search results 133 as indicated by the search result selections 136.

Different types of search result selections 136 may be associated with differing levels of user interest. For example, it may be concluded that a user has a greater level of interest in a particular video content feature if he or she views the entire video content feature as opposed to merely viewing the selected portion that corresponds to the search result 133. Further, different types of media content may be associated with stronger or weaker levels of user interest. As a non-limiting example, a selection of a video clip from a movie may be associated with a stronger level of user interest than a selection of an audio clip from a song.

If search results 133 are not selected for particular search queries 130, it may be determined that the user does not express an interest in the particular search results 133. In other words, the absence of search result selections 136 by a user may be used to infer disinterest by a user or lack of relevance of the search results 133. Also, the search analysis application 121 may determine that the user has expressed an interest in a product or other subject due to the inclusion of the subject in the search query 130 or in the verbal media content associated with a selected search result 133. From this analysis that is performed, the search analysis application 121 generates the user interest data 154.

The user interest data 154 may be used in various approaches according to various embodiments. In one embodiment, an abridgement generation application 124 processes the user interest data 154 and generates abridgement data 163 that includes abridgements of media content features 142. The abridgement for a particular media content feature 142 may exclude one or more portions of the media content feature 142. For example, the abridgement generation application 124 may determine the most popular scenes from a particular movie, and then dynamically generate a trailer for that movie from the most popular scenes. A subset of the most popular scenes may be selected based at least in part on a predefined maximum length for the trailer.

Customized abridgements may be generated for a particular user based at least in part on interests expressed by the particular user or users who are similar to the particular users. Similarity between users may be determined based at least in part on similar user interest data 154, similar user profile data 157, social network data 166, and so on. Customized abridgements may also be generated for a group of users or for a general audience.

The abridgement generation application 124 or other applications may be configured to generate representative content portions in the representative content portions data 169 based at least in part on the user interest data 154. For example, the abridgement generation application 124 may determine the most popular scene in a movie according to the number of search result selections 136. The particular scene may be designated as a representative content portion. Alternatively, an image corresponding to a time in the particular scene may be designated as a representative content portion.

In another embodiment, the recommendations application 127 processes the user interest data 154 to generate recommendations 139 of media content features 142 for users. The recommendations application 127 may also consider user profile data 157 in addition to the user interest data 154. The recommendations 139 may be presented in user interfaces 178, email messages, text messages, and/or other forms of communication. The recommendations application 127 may recommend a particular media content feature 142 to a given user based at least in part on the given user performing verbal media content searches, users related by a social network to the given user performing verbal media content searches, or users similar to the given user performing verbal media content searches. The recommendations application 127 may also, or instead, generate recommendations 139 of portions of media content features 142 such as, for example, scenes, chapters, etc. In some cases, a particular media content feature 142 or a portion thereof may be recommended based at least in part on relative popularity as determined from the user interest data 154.

As a non-limiting example, a user may be classified in the user profile data 157 as being interested in comedies. The recommendations application 127 may recommend media content features 142 to the user based at least in part on search result selections 136 of other users who are interested in comedies. As another non-limiting example, a user may be determined to be interested in documentaries based at least in part on the search result selections 136 of the user. The recommendations application 127 may recommend to the user other media content features 142 that are classified as documentaries.

The recommendations application 127 may also recommend a particular product based at least in part on the user searching for the product or a similar product in a search query 130 or the user selecting a search result 133 that mentions the product or a similar product. As a non-limiting example, a user may execute a search for dialogue that includes "Chero-Cola," and the recommendations application 127 may generate recommendations 139 for the user for products relating to "Chero-Cola." Alternatively, a user may execute a search for some other dialogue that does not include "Chero-Cola," and then select a search result 133 having dialogue that does include "Chero-Cola" or a search result 133 that is otherwise inferred to be relevant to "Chero-Cola." Accordingly, the recommendations application 127 may generate recommendations 139 for the user for products relating to "Chero-Cola."

In various embodiments, the user interest data 154 correlated with particular portions of a media content feature 142 may be used to render advertising at relatively popular portions of the media content feature 142. That is to say, advertising may be preferably displayed along with a relatively popular portion of the media content feature 142. To this end, an advertisement may be associated with the relatively popular portion based at least in part on the user interest data 154. Also, this information may be used to determine pricing for advertising based at least in part on popularity of a portion of the media content feature 142 as determined through the user interest data 154. In other words, a relatively popular portion of a media content feature 142 may command a relatively higher advertising rate versus other portions.

The user interest data 154 may be used to determine relatively popular media content features 142 and/or relatively popular portions of media content features 142. In one embodiment, a popularity rating may be assigned to the media content feature 142 or to one or more portions of the media content feature 142 based at least in part on quantity or frequency of user selections, and/or on the type of user selections. Such popularity ratings may be surfaced to users in personalized recommendations 139, in user interfaces 178 presenting information about a media content feature 142, in user interfaces 178 presenting search results 133, or elsewhere.

It is noted that a given media content feature 142 may be distributed with verbal media content in a primary language and potentially multiple secondary languages. Users who understand a particular language may not be as interested in certain portions of a media content feature 142 compared to users who understand a different languages. Such differences in perception between users may have a cultural basis. For example, users in one locale who speak one language may find a particular scene humorous, while users in another locale who speak another language may find the same scene distasteful. Accordingly, recommendations 139, abridgements, and so on may be generated based at least in part on user languages and locales.

Figure 3:
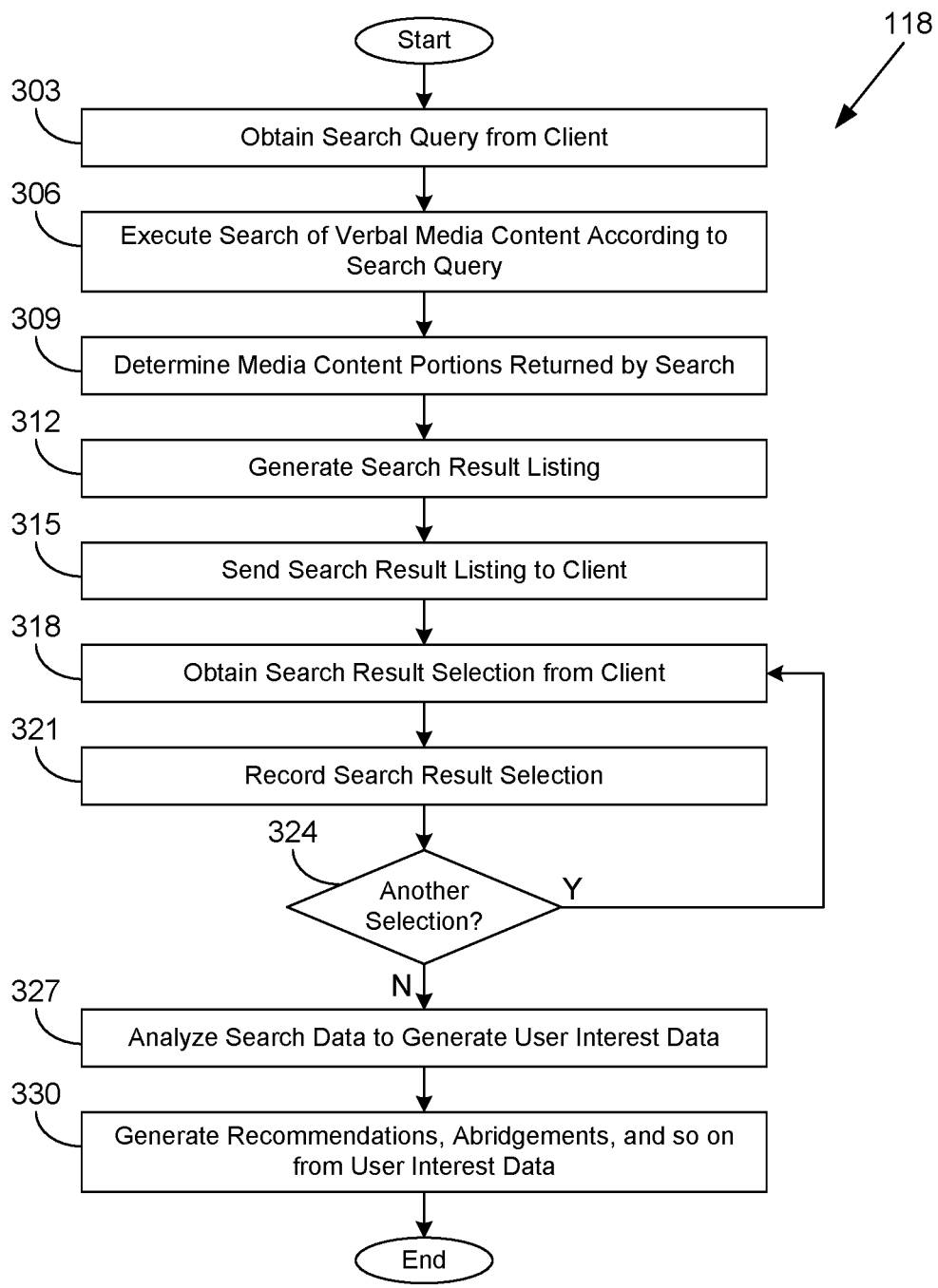
FIG. 3 is a flowchart illustrating one example of functionality implemented as portions of a verbal media content search engine executed in a computing environment in the networked environment of FIG. 1 according to various embodiments of the present disclosure.

Referring next to FIG. 3, shown is a flowchart that provides one example of the operation of a portion of the verbal media content search engine 118 according to various embodiments. It is understood that the flowchart of FIG. 3 provides merely an example of the many different types of functional arrangements that may be employed to implement the operation of the portion of the verbal media content search engine 118 as described herein. As an alternative, the flowchart of FIG. 3 may be viewed as depicting an example of steps of a method implemented in the computing environment 103 (FIG. 1) according to one or more embodiments.

Beginning with box 303, the verbal media content search engine 118 obtains a search query 130 (FIG. 1) from a client 106 (FIG. 1) by way of the network 109 (FIG. 1). The search query 130 may be obtained through data received by the network content server 115 (FIG. 1). In box 306, the verbal media content search engine 118 executes a search of verbal media content data 145 (FIG. 1) based at least in part on the search query 130. The search may correspond to a dialogue search, a lyrics search, an audio book text search, or other verbal media content searches.

In box 309, the verbal media content search engine 118 determines one or more media content portions that are returned as a result of the search. Such portions may correspond to video clips, audio clips, etc. In one embodiment, the verbal media content search engine 118 determines a media content clip based at least in part on data associating a time in a media content feature 142 (FIG. 1) with the verbal media content that matches, substantially matches, or partially matches the search query 130. In box 312, the verbal media content search engine 118 generates a listing of search results 133 (FIG. 1). In box 315, the verbal media content search engine 118 sends the search results 133 to the client 106 through the network content server 115. In box 318, the verbal media content search engine 118 obtains a search result selection 136 from the client 106. The search result selection 136 may correspond to a user selecting a particular search result 133 to view a detail page, add a corresponding media content feature 142 to a watch list, to view or playback all or a portion of a corresponding media content feature 142, and or other types of selections. In box 321, the verbal media content search engine 118 records the search result selection 136 and potentially the search query 130 in the search data 151 (FIG. 1).

In box 324, the verbal media content search engine 118 determines whether another search result selection 136 from the search results 133 is received. If another search result selection 136 is received, the verbal media content search engine 118 returns to box 318 and obtains the next search result selection 136. Otherwise, the verbal media content search engine 118 continues to box 327.

In box 327, the verbal media content search engine 118 employs the search analysis application 121 (FIG. 1) to analyze the search data 151. In doing so, the search analysis application 121 determines whether the user has expressed an interest in one or more of the portions of media content features 142 corresponding to search results 133. Accordingly, the search analysis application 121 generates user interest data 154 (FIG. 1) in response to users expressing an interest in one or more of the search results 133. In some cases, the user interest data 154 describes an aggregate interest of a group of users in particular media content.

In box 330, the verbal media content search engine 118 employs the recommendations application 127 (FIG. 1), the abridgement generation application 124 (FIG. 1), and/or other applications to generate recommendations 139 (FIG. 1), abridgements, representative content portions, and/or other data based at least in part on the user interest data 154. In some cases, a content classification (e.g., a genre, a plot element type, etc.) may be assigned to a portion of a media content feature 142 based at least in part on an interest expressed by a user and user profile data 157 (FIG. 1) associated with the user. For example, a user may be profiled as being a fan of comedy, and in some cases, a video clip may be classified as comedy based at least in part on the demonstrated interest of the user and the profile of the user.

In generating recommendations 139, the recommendations application 127 may recommend other media content features 142 to the user, recommend the selected one of the portions of the media content feature 142 to other users, and so on based at least in part on the user interest data 154. The recommendations application 127 may determine a relationship between a user and other users based at least in part on an interest of the user in media content as expressed in the user interest data 154. The other user may be determined based at least in part on an association between a secondary language and the other user. The other user may also be determined based at least in part on social network data 166 (FIG. 1) indicating a relationship between the user and the other user.

In generating an abridgement, the abridgement generation application 124 may generate the abridgement based at least in part on a maximum length, and the abridgement may include a first portion of the media content feature 142 and a second portion of the media content feature 142 while excluding a third portion of the media content feature 142 that is between the first and second portions. Thereafter, the portion of the verbal media content search engine 118 ends.

Figure 4:
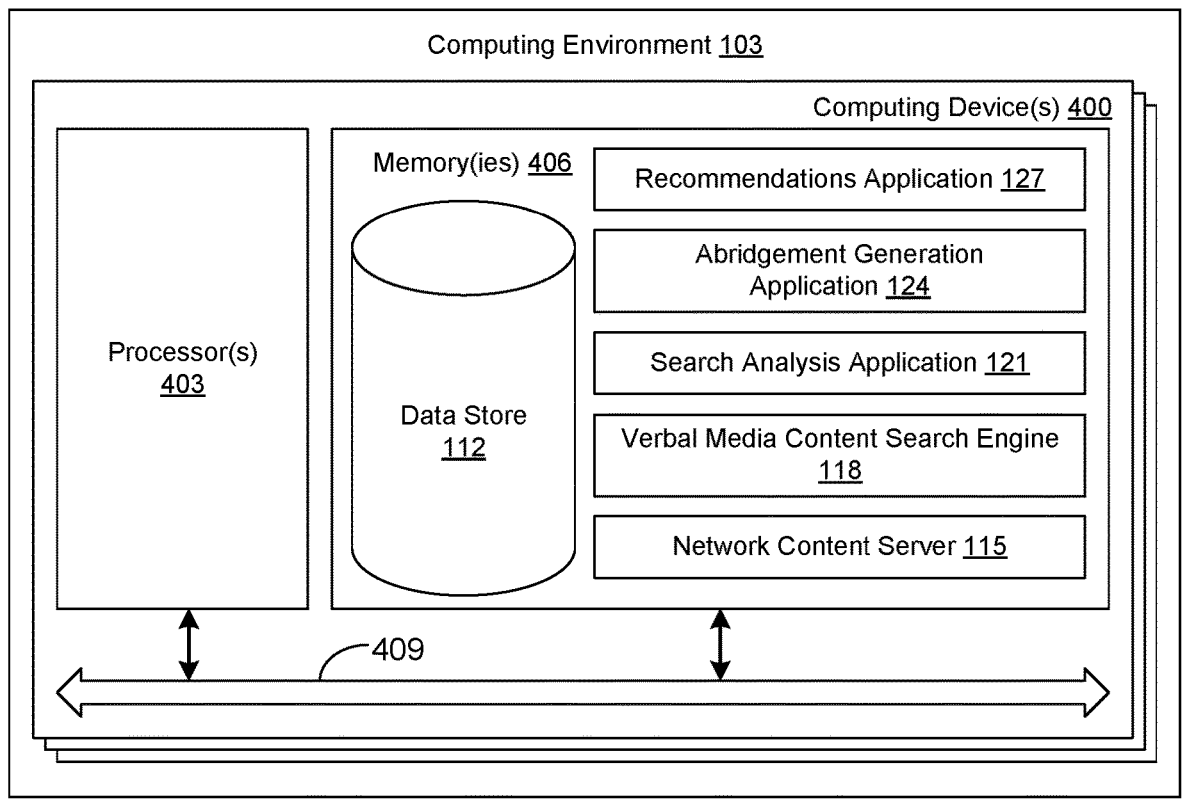
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network content server 115, the verbal media content search engine 118, the search analysis application 121, the abridgement generation application 124, the recommendations application 127, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the network content server 115, the verbal media content search engine 118, the search analysis application 121, the abridgement generation application 124, the recommendations application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the verbal media content search engine 118 and potentially other applications. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network content server 115, the verbal media content search engine 118, the search analysis application 121, the abridgement generation application 124, and the recommendations application 127, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method, comprising:
   determining, by at least one computing device, a popular portion of a media content item based at least in part on a dialogue of the popular portion of the media content item being included in a plurality of dialogue search queries received from a plurality of client devices;
   causing, by the at least one computing device, the media content item to be rendered via a client device; and
   causing, by the at least one computing device, a recommendation for an item to be rendered via the client device in response to the popular portion of the media content item being rendered.

2. The method of claim 1, further comprising receiving, by the at least one computing device, a selection of the media content item from the client device.

3. The method of claim 1, further comprising determining, by the at least one computing device, the popular portion of the media content item based at least in part on a quantity or a frequency of user selections of the media content item from a plurality of dialogue search results following the plurality of dialogue search queries.

4. The method of claim 1, wherein the recommendation for the item is rendered by the client device concurrently with the popular portion of the media content item.

5. The method of claim 1, further comprising determining, by the at least one computing device, the item from the dialogue of the popular portion of the media content item.

6. The method of claim 5, wherein determining the item from the dialogue of the popular portion of the media content item further comprises determining, by the at least one computing device, that the item is discussed in the dialogue of the popular portion of the media content item.

7. The method of claim 5, wherein determining the item from the dialogue of the popular portion of the media content item further comprises determining, by the at least one computing device, that another item that is similar to the item is discussed in the dialogue of the popular portion of the media content item.

8. The method of claim 1, wherein the recommendation for the item corresponds to an advertisement for the item.

9. The method of claim 8, further comprising determining, by the at least one computing device, pricing for the advertisement based at least in part on the dialogue of the popular portion of the media content item being included in the plurality of dialogue search queries received from the plurality of client devices.

10. A system, comprising:
    at least one computing device; and
    instructions executable in the at least one computing device, wherein when executed the instructions cause the at least one computing device to at least:
       determine a popular portion of a media content item based at least in part on a dialogue of the popular portion of the media content item being included in a plurality of dialogue search queries received from a plurality of client devices; and
       cause a recommendation for an item to be presented to a user in response to the popular portion of the media content item being rendered via a client device associated with the user.

11. The system of claim 10, wherein the recommendation is presented to the user via a display of the client device.

12. The system of claim 10, wherein the recommendation is presented to the user via a text message.

13. The system of claim 10, wherein the instructions further cause the at least one computing device to at least cause the media content item to be presented to the user via the client device in response to receiving a selection of the media content item from the user.

14. The system of claim 10, wherein the instructions further cause the at least one computing device to at least determine the popular portion of the media content item based at least in part on a quantity or a frequency of user selections of the media content item from a plurality of dialogue search results following the plurality of dialogue search queries.

15. The system of claim 10, wherein the recommendation for the item is rendered by the client device concurrently with the popular portion of the media content item.

16. The system of claim 10, wherein the instructions further cause the at least one computing device to at least determine that the item is discussed in the dialogue of the popular portion of the media content item.

17. The system of claim 10, wherein the instructions further cause the at least one computing device to at least determine that another item that is similar to the item is discussed in the dialogue of the popular portion of the media content item.

18. The system of claim 10, wherein the instructions further cause the at least one computing device to at least determine a price for presenting the recommendation based at least in part on the dialogue of the popular portion of the media content item being included in the plurality of dialogue search queries received from the plurality of client devices.

19. A method, comprising:
    determining, by at least one computing device, a popular portion of a media content item based at least in part on a dialogue of the popular portion of the media content item being included in a plurality of dialogue search queries received from a plurality of client devices; and
    causing, by the at least one computing device, an advertisement to be presented to a user in response to the popular portion of the media content item being rendered via a client device associated with the user.

20. The method of claim 19, wherein the advertisement is for a product discussed during in the dialogue of the popular portion of the media content item.

* * * * *